(12) United States Patent
Imamura

(10) Patent No.: US 7,920,125 B2
(45) Date of Patent: Apr. 5, 2011

(54) ELECTRONIC APPARATUS

(75) Inventor: Akira Imamura, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 408 days.

(21) Appl. No.: 12/194,327

(22) Filed: Aug. 19, 2008

(65) Prior Publication Data

US 2009/0140979 A1 Jun. 4, 2009

(30) Foreign Application Priority Data

Nov. 30, 2007 (JP) ................................. 2007-311163

(51) Int. Cl.
| | |
|---|---|
| *A47B 85/00* | (2006.01) |
| *G06K 11/06* | (2006.01) |
| *G06F 3/033* | (2006.01) |
| *G06F 3/041* | (2006.01) |
| *G06F 1/16* | (2006.01) |
| *G09G 5/08* | (2006.01) |
| *H05K 5/00* | (2006.01) |
| *H05K 7/00* | (2006.01) |
| *F21V 7/04* | (2006.01) |
| *H01R 3/00* | (2006.01) |

(52) U.S. Cl. ....... 345/157; 108/23; 178/18.11; 345/173; 361/679.1; 361/679.18; 361/679.19; 362/632; 439/490

(58) Field of Classification Search ..................... 108/23; 178/18.01–18.11; 345/156–158, 173; 361/600, 361/679.01, 679.02, 679.09, 679.1, 679.18, 361/679.19; 362/600–634; 439/488–491
See application file for complete search history.

(56) References Cited

U.S. PATENT DOCUMENTS

| | | | | |
|---|---|---|---|---|
| 6,262,717 | B1 * | 7/2001 | Donohue et al. | 345/173 |
| 6,357,887 | B1 * | 3/2002 | Novak | 362/26 |
| 6,822,640 | B2 * | 11/2004 | Derocher | 345/173 |
| 6,933,929 | B1 * | 8/2005 | Novak | 345/173 |
| 7,156,693 | B2 | 1/2007 | Kusaka | |
| 7,443,388 | B1 * | 10/2008 | Novak | 345/173 |
| 7,804,487 | B1 * | 9/2010 | Acampora et al. | 345/169 |
| 2004/0027341 | A1 * | 2/2004 | Derocher | 345/173 |
| 2005/0195172 | A1 | 9/2005 | Lu | |
| 2007/0200834 | A1 * | 8/2007 | Lu et al. | 345/173 |

FOREIGN PATENT DOCUMENTS

| | | |
|---|---|---|
| CN | 1517826 A | 8/2004 |
| CN | 1779631 A | 5/2006 |
| JP | 2002-149338 | 5/2002 |
| JP | 2002-297309 | 10/2002 |
| JP | 2003-248549 | 9/2003 |
| JP | 2004-227222 | 8/2004 |

OTHER PUBLICATIONS

Office Action for Japanese Patent Application 2007-311163, mailed Dec. 16, 2008. The First Office Action mailed by State Intellectual Property Office of the People's Republic of China on Jun. 11, 2010 in the corresponding Japanese patent application No. JP 2007-311163.

* cited by examiner

*Primary Examiner* — Alexander S. Beck
(74) *Attorney, Agent, or Firm* — Knobbe, Martens, Olson & Bear LLP

(57) ABSTRACT

According to one embodiment, an electronic apparatus includes a housing having an outer surface and an inner surface, a pointing device having a flat input surface and located in the housing with the input surface on the inner surface of the housing, an operation area provided in a position on the outer surface of the housing corresponding to at least a part of the pointing device, and a display section which illuminates at least a part of an outline of the operation area and displays a position of the operation area.

7 Claims, 5 Drawing Sheets

US 7,920,125 B2

ELECTRONIC APPARATUS

CROSS-REFERENCE TO RELATED APPLICATIONS

This application is based upon and claims the benefit of priority from Japanese Patent Application No. 2007-311163, filed Nov. 30, 2007, the entire contents of which are incorporated herein by reference.

BACKGROUND

1. Field

One embodiment of the present invention relates to an electronic apparatus, such as a portable computer, provided with a pointing device having a flat input surface.

2. Description of the Related Art

An electronic apparatus, such as a notebook computer, is provided with a housing that forms an outer wall and an input device contained in the housing. The input device may be, for example, a pointing device that inputs information by means of a sheet capable of detecting electrostatic capacitance or a touch panel that inputs information by using a pressure-sensitive film capable of detecting pressure.

In recent years, there have been provided electronic apparatuses in which a pointing device is mounted on the inner surface of a housing and an operation area is located in a position on the outer surface of the housing corresponding to the pointing device (e.g., Jpn. Pat. Appln. KOKAI Publication No. 2004-227222). According to one such electronic apparatus, the pointing device is contained in the housing, so that an input surface of the pointing device need not be protected by any protective cover or the like and the apparatus can be assembled with ease. Further, the housing need not be provided with any opening through which the pointing device is exposed, so that the designability of the apparatus can be improved.

If the pointing device is located inside the housing, as in the electronic apparatus constructed in this manner, its operation area should be configured to be easily recognized by a user from outside the housing. Although the above-described electronic apparatus is contrived so that the operation area is roughened or varied in color, it is still expected to be improved in operability and designability.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided an electronic apparatus comprising: a housing having an outer surface and an inner surface; a pointing device having a flat input surface and located in the housing with the input surface on the inner surface of the housing; an operation area provided in a position on the outer surface of the housing corresponding to at least a part of the pointing device; and a display section which illuminates at least a part of an outline of the operation area and displays a position of the operation area.

A first embodiment applied to a portable computer as an electronic apparatus of this invention will now be described in detail with reference to the accompanying drawings.

Figure 1:
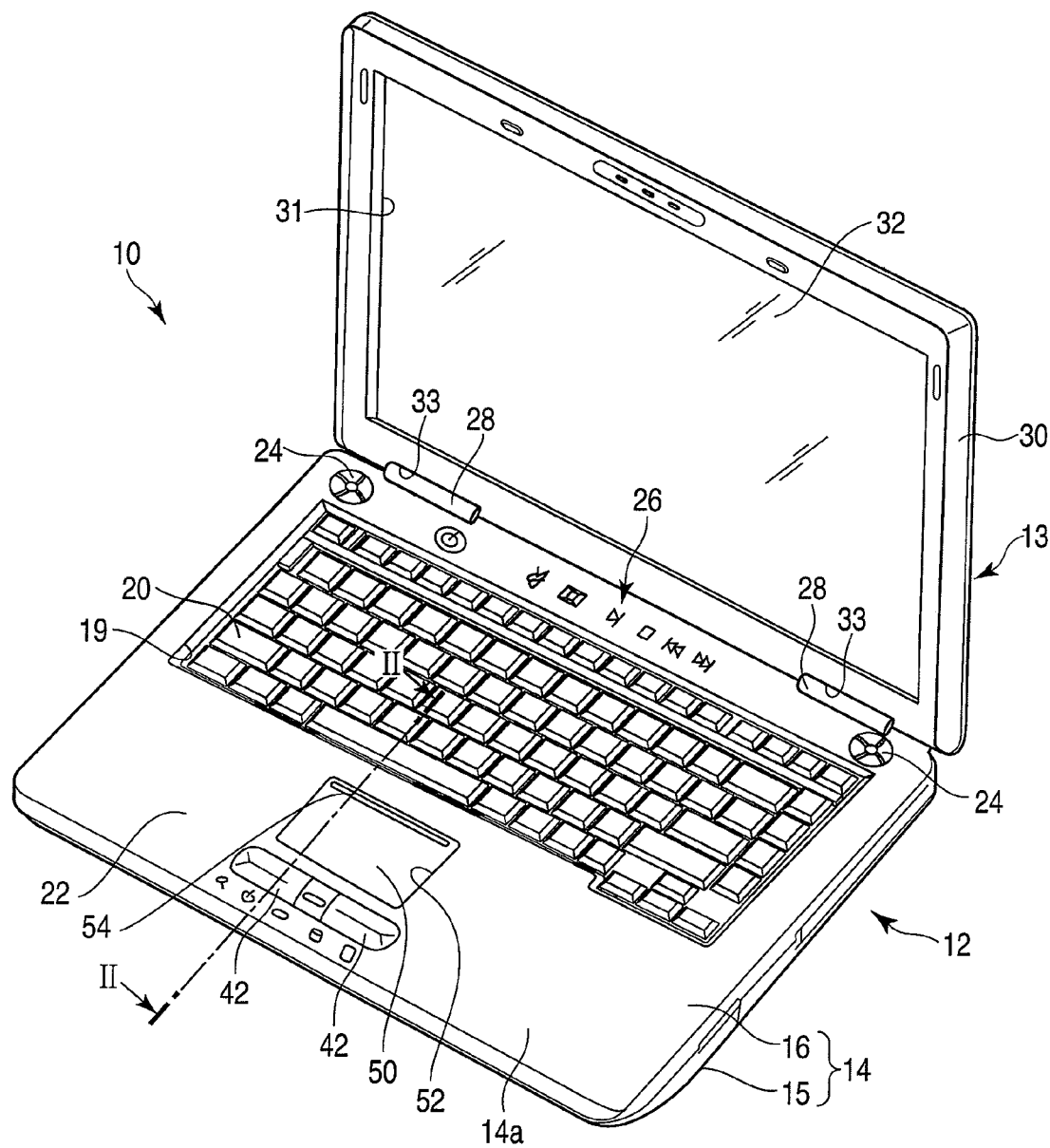
FIG. 1 is an exemplary perspective view showing a personal computer according to a first embodiment of the invention.
Figure 2:
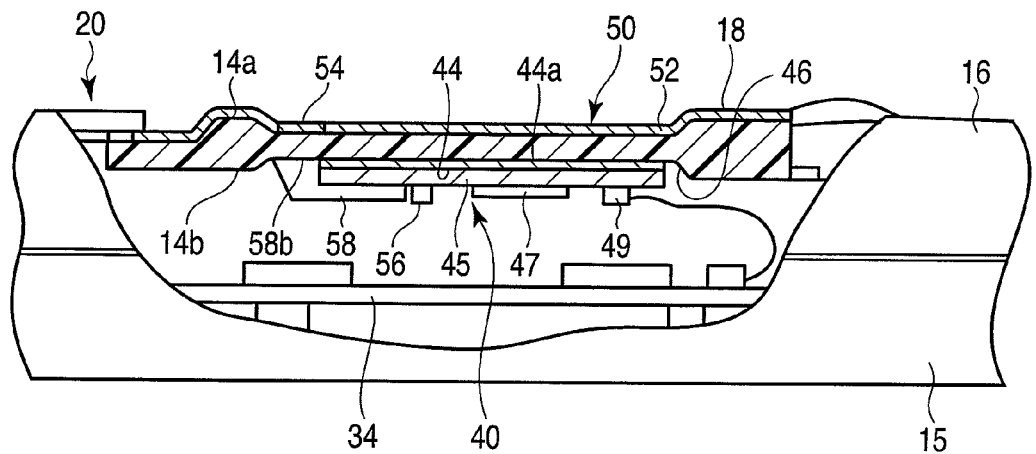
FIG. 2 is an exemplary sectional view of the personal computer taken along line II-II of FIG. 1.

FIG. 1 shows a notebook portable computer, and FIG. 2 shows an operation area and a pointing device of the portable computer.

As shown in FIG. 1, a portable computer 10 is provided with a main body 12 and a display unit 13 supported on the body. The main body 12 includes a housing 14. The housing 14 includes a rectangular base 15 and a substantially rectangular cover 16 and has the form of a flat box. As shown in FIGS. 1 and 2, an outer wall of the housing 14 has an outer surface 14a, which is exposed to the outside, and an inner surface 14b.

The cover 16 that constitutes the housing 14 is formed of a light-transmitting resin, such as an acrylic resin. A surface of the cover 16 is covered by a light-shielding surface layer (opaque film) 18. As mentioned later, a part of the surface layer 18 is formed to be transparent and permeable to light.

A substantially rectangular opening 19 is formed spanning from the central portion to the rear half portion of the cover 16, and a keyboard 20 is exposed in the opening. A substantially front half portion of the cover 16 forms a palm rest 22. As mentioned later, an operation area 50 and click switches 42 for operating the pointing device are arranged in the central portion of the palm rest 22.

A pair of speakers 24 are disposed at the rear end portion of the cover 16, and a plurality of control button indicators 26 are arranged between the speakers. Further, a pair of leg portions 28 are arranged spaced along the width of the housing 14 at the rear end portion of the cover 16.

The display unit 13 is provided with a display housing 30 and a liquid crystal panel 32 contained in the housing 30. A display window 31 is formed in a front wall of the display housing 30. The window 31 has a size that covers a large part of the front wall of the window 31, and a display screen of the liquid crystal panel 32 is exposed to the outside of the display housing 30 through the window 31.

The display housing 30 has a pair of connecting recesses 33 at one end portion thereof. These recesses 33 are spaced along the width of the display housing 30 and engaged individually with the leg portions 28 of the housing 14. The display housing 30 is supported for swinging motion with respect to the housing 14 by the connecting recesses 33 and hinges (not shown) that are attached to the leg portions 28.

Thus, the display unit 13 is swingable between a closed position in which it is leveled so as to cover the top surface of the housing 14, including the palm rest 22 and the keyboard 20, from above and an open position in which it is raised so that the top surface of the housing and the liquid crystal panel 32 are exposed. In FIG. 1, the portable computer 10 is shown in the open position.

As shown in FIGS. 1 and 2, the housing 14 contains a printed circuit board 34, a pointing device 40 for use as an input device, etc., as well as a hard disk drive (HDD, not shown), an optical disc drive, etc. The printed circuit board 34 and the HDD are screwed to the bottom wall of the base 15 of the housing 14.

Figure 3:
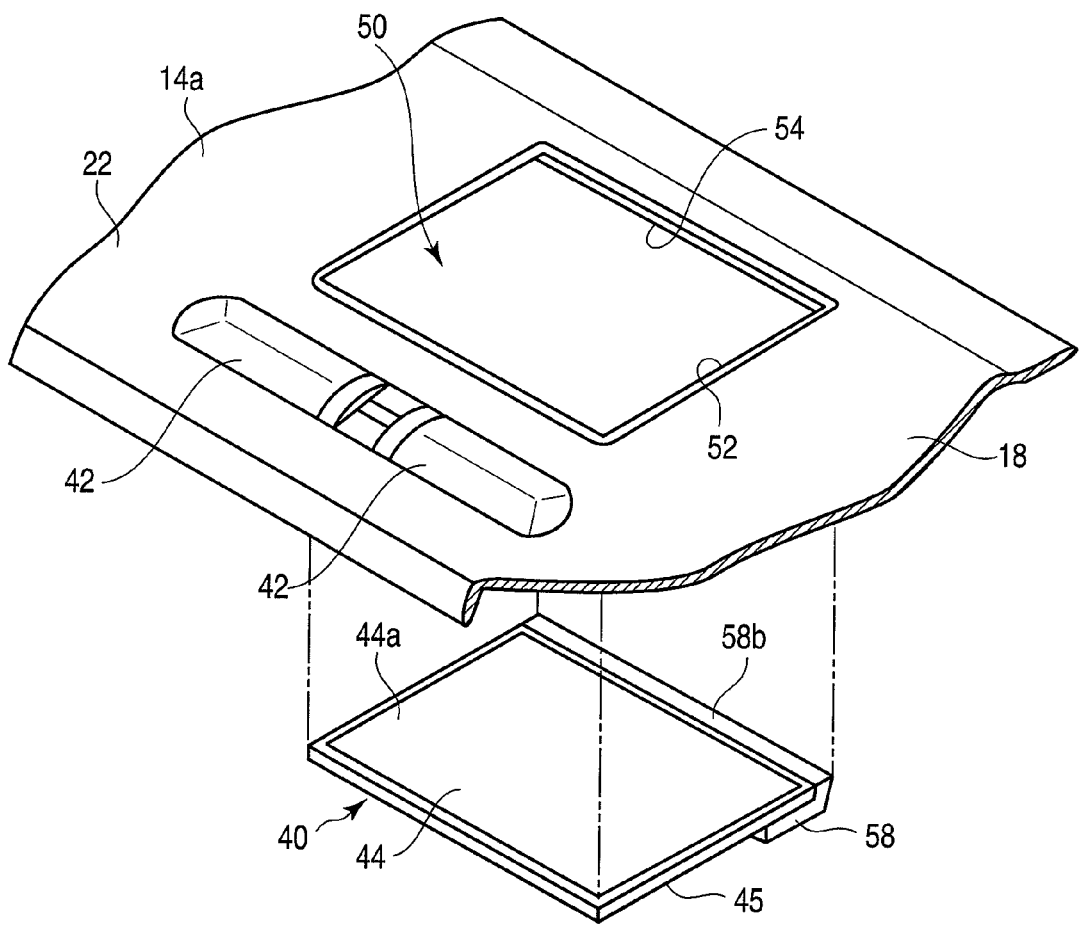
FIG. 3 is an exemplary exploded perspective view showing an operation area and a pointing device of the personal computer.
Figure 4:
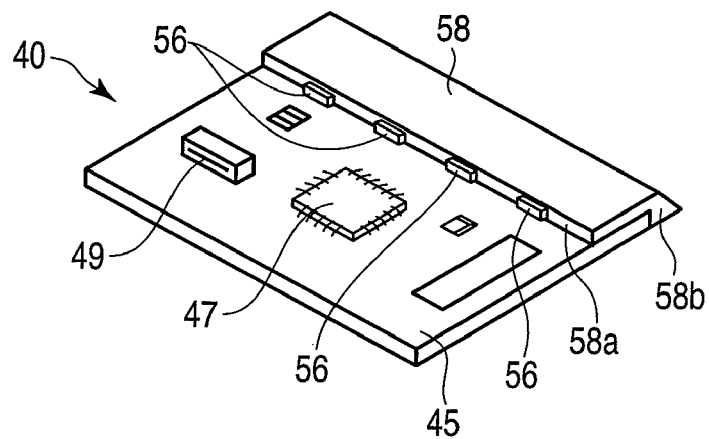
FIG. 4 is an exemplary perspective view showing the other surface side of the pointing device.

As shown in FIGS. 2, 3 and 4, the pointing device 40 is provided with an input sheet 44 and a printed circuit board 45 that constitutes a drive unit. The input sheet 44 is a sensor sheet that detects, for example, electrostatic capacitance, and one surface of the sheet is formed as a flat input surface 44a. The input sheet 44, which has a rectangular shape, for example, is affixed to one surface of the printed circuit board 45, which is also rectangular, and is electrically connected to the printed circuit board. A drive IC 47, a connector 49, etc., are mounted on the other surface of the printed circuit board 45.

The pointing device 40 is contained in the housing 14 in such a manner that the input surface 44a is arranged on the inner surface 14b of the housing 14 or is arranged on and affixed to the central portion of the inner surface of the palm rest 22 of the cover 16, in this case. In this state, the pointing device 40 is affixed to the inner surface of the housing 14 with a double-sided tape, for example. A depression 46 and a positioning rib (not shown) are formed in the central portion of the inner surface of the palm rest 22. The pointing device 40 is positioned by the positioning rib as it is affixed to the bottom surface of the depression 46.

In the portable computer 10, the cover 16 is formed of a resin, and its outer surface is covered by the light-shielding surface layer 18. Further, the pointing device 40 is contained in the housing 14. Accordingly, the position of the input surface 44a cannot be visually recognized from outside the housing 14. In the portable computer 10, therefore, the operation area 50 for input operations is provided on the outer surface 14a of the housing 14 in a position corresponding to at least a part of the pointing device 40, e.g., a substantially entire surface of the input surface 44a. Thus, in the portable computer 10, the input sheet 44 is located overlapping the central portion of the inner surface of the cover 16, so that the operation area 50 is located in the central portion of the palm rest 22 or the outer surface 14a of the cover 16.

The operation area 50 should only be configured to be distinguishable visually or tactually from its surroundings. The operation area 50 is defined by a rectangular recess 52 that is formed in the palm rest 22 so that its bottom surface is substantially as wide as the input surface 44a. Thus, the bottom surface of the recess 52 serves as the operation area 50. The recess 52 is situated between the keyboard 20 and the click switches 42 so that its one side extends substantially parallel to the lower edge of the keyboard 20.

The surface layer 18 also covers the recess 52. That region of the surface layer 18 which overlaps the operation area 50 is formed to be different in surface roughness from its surrounding region. For example, the overlapping region of the surface layer 18 is grained to be rough, while the surrounding region is smooth. Alternatively, the periphery of the operation area 50 may be roughened instead of roughening the surface of the operation area 50. Further, the operation area 50 may be made flush with the surrounding region without being provided with the recess 52.

The cover 16 is formed with a display section 54, which illuminates at least a part of the outline of the operation area 50 and displays the position of the operation area. The display section 54 is in the form of an elongated belt that extends along one side of the operation area 50. Thus, the display section 54 extends along one side of the recess 52 on the keyboard side and situated between the operation area 50 and the keyboard 20. That part of the surface layer 18 which corresponds to the display section 54 is formed to be transparent and permeable to light.

The display section 54, which is transparent, may be either colored or colorless. The display section 54 is not limited to a continuous belt, but may alternatively be segmented or formed intermittently in a dotted line.

The pointing device 40 is provided with light source means that is located corresponding to the display section 54 and illuminates the display section. As shown in FIGS. 2 and 4, a plurality of, e.g., four, LEDs 56 as the light source are mounted on the printed circuit board 45 of the pointing device 40. The LEDs 56 are arranged parallel to one side of the printed circuit board 45 and regularly spaced from one another.

A light guide plate 58 that guides light from the LEDs 56 to the display section 54 is mounted on the printed circuit board 45. The light guide plate 58 has an incident surface 58a and an exit surface 58b in the shape of an elongated belt. The incident surface 58a extends substantially at right angles to the printed circuit board 45 and faces the LEDs 56. The exit surface 58b extends along one side edge of the printed circuit board 45 and is situated flush with the input sheet 44. The exit surface 58b of the light guide plate 58 is arranged on the inner surface of the cover 16 in the depression 46 and faces the display section 54. The light emitted from the LEDs 56 is guided by the light guide plate 58 toward the display section 54 through the exit surface 58b and further emitted to the outside of the housing 14 via the display section 54. Thus, the upper side of the operation area 50 is illuminated by the display section 54, whereby the position of the operation area 50 is displayed.

A user can visually recognize the operation area 50 through the display section 54 illuminated by the light source means. Since the surface of the operation area 50 is rougher than that of the surrounding region, moreover, it can also be recognized tactually. If a finger is moved on the operation area 50, its movement is sensed by the input sheet 44 of the pointing device 40, and a desired input operation is performed.

If the input operation by means of the pointing device 40 is effective, the display section 54 is illuminated and displayed as the LEDs 56 are lit. If the input operation is not effective, the LEDs 56 are turned off. Thus, the display section 54 can display the status of the pointing device 40 as well as the position of the operation area 50.

Figure 5:
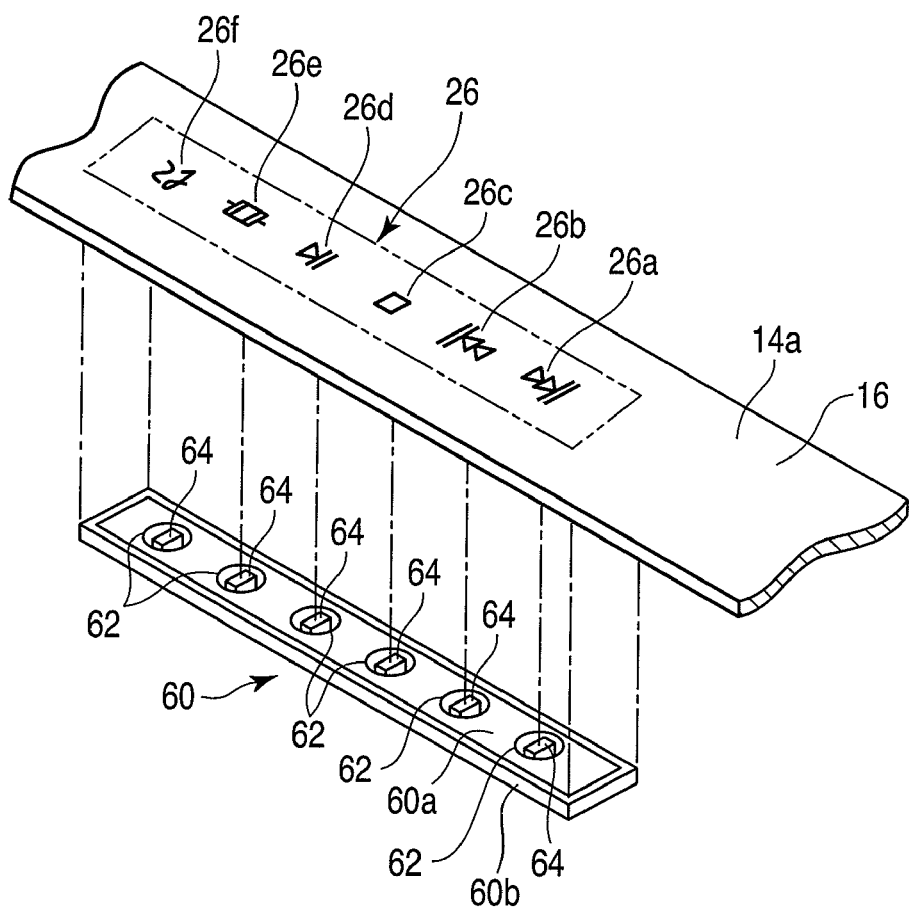
FIG. 5 is an exemplary exploded perspective view showing control button indicators and a touch pad of the personal computer.
Figure 6:
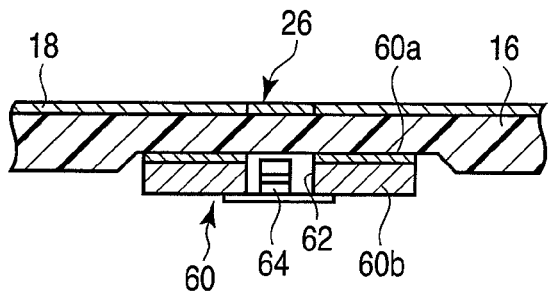
FIG. 6 is an exemplary sectional view showing one of the control button indicators and the touch pad of the personal computer.

As shown in FIGS. 1, 5 and 6, the control button indicators 26 are formed side by side on the outer surface 14a of the housing 14, e.g., at the rear end portion of the cover 16. The control button indicators 26 include, for example, a fast-forward button 26a, rewind button 26b, stop button 26c, pause button 26d, application start button 26e, and mute button 26f, which are used in video display operation. These buttons have marks of their corresponding shapes. Each mark is formed by making a part of the surface layer 18 that covers the outer surface of the cover 16 transparent and permeable to light. Each button, which is transparent, may be either colored or colorless.

A touch pad 60 for detecting the input operation through the control button indicators 26 is arranged on the inner surface of the cover 16 so as to face the control button indicators 26. The touch pad 60 includes an elongated rectangular input sheet 60a and a printed circuit board 60b that constitutes a drive unit. The input sheet 60a corresponds in size to the control button indicators 26 as a whole. The printed circuit board 60b is an elongated rectangular structure that is equivalent to the input sheet 60a in size. The input sheet 60a is a sensor sheet for detecting, for example, electrostatic capacitance, and is affixed to one surface of printed circuit board 60b. The touch pad 60 is affixed to the inner surface of the cover 16 with the input sheet 60a on the inner surface of the cover.

Circular through-holes 62 are formed in the input sheet 60a and the printed circuit board 60b in positions opposite the control buttons 26a to 26f, individually. Each through-hole 62 is formed to be smaller in diameter than a fingertip of the user, for example. LEDs 64 that serve as light sources are located in the through-holes 62, individually, and electrically connected to the printed circuit board 60b. The LEDs 64 are opposed to the control buttons 26a to 26f, individually, and apply light for illumination to the control buttons from the inner surface side of the cover 16. If the user touches any of the control buttons 26a to 26f from outside the cover 16, the touch is detected by the input sheet 60a, and an input operation corresponding to the touched button is performed.

According to the personal computer 10 constructed in this manner, the pointing device 40 is located in the housing 14 with its input surface 44a on the inner surface 14b of the housing 14, so that the input surface 44a need not be protected by any protective cover or the like. Thus, the assemblability for the pointing device 40 to be contained in the housing 14 can be improved. Since a protective cover can be omitted, moreover, the portable computer 10 can be reduced in weight.

Further, the operation area 50 for input operations is provided in the outer surface of the housing 14 in the position corresponding to the pointing device 40, and the display section 54 is provided for optically displaying the position of the operation area. Even though the pointing device 40 is contained in the housing 14, therefore, the position of the input surface 44a can be easily recognized from outside the housing 14. Thus, the operability of the device 40 can be enhanced. Furthermore, no opening is needed through which the pointing device 40 is exposed in the outer surface of the housing 14. In consequence, the flexibility of design of the housing is increased, so that the designability of the personal computer 10 can be improved.

If the housing 14 is formed of a resin, the operation of the pointing device 40 cannot be influenced by the contact between the housing 14 and the input surface 44a of the input sheet 44 that detects the electrostatic capacitance. The palm rest 22 is provided on the outer surface 14a of the housing 14, and the operation area 50 is disposed on the palm rest. Thus, the pointing device 40 has good operability.

Accordingly, there can be obtained an electronic apparatus of which the operation area of the pointing device can be clearly displayed to enhance the operability of the device and the designability can be improved.

In the first embodiment described above, the surface layer of the housing 14 is formed so that the operation area 50 and the surrounding region are different in roughness. Alternatively, however, the operation area 50 and the surrounding region may be differentiated by the color or pattern of the surface layer.

Figure 7:
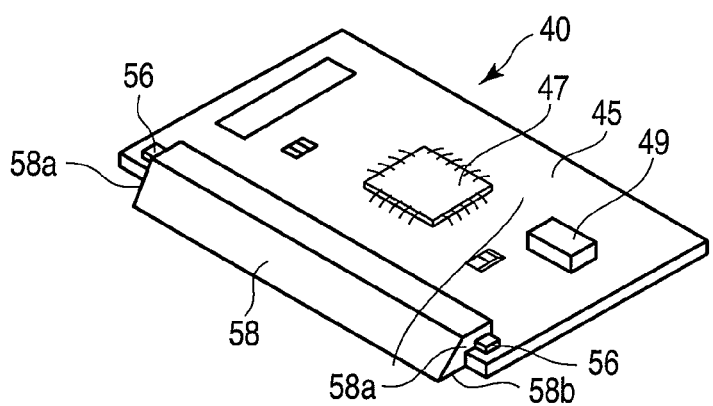
FIG. 7 is an exemplary perspective view showing a pointing device of a personal computer according to a second embodiment of the invention.

The following is a description of a personal computer according to a second embodiment of the invention. According to the present embodiment, as shown in FIG. 7, a pointing device 40 is provided with two LEDs 56 as light sources, and these LEDs are mounted individually on the opposite end portions of one side of a printed circuit board 45. A light guide plate 58 is in the form of an elongated rectangular plate, which is fixed on the one side portion of the printed circuit board 45. The light guide plate 58 has a pair of incident surfaces 58a and an exit surface 58b in the shape of an elongated belt. The incident surfaces 58a are situated at the longitudinally opposite ends of the guide plate 58 and opposed individually to the LEDs 56. The exit surface 58b extends along one side edge of the printed circuit board 45 and is situated flush with an input sheet 44.

As in the first embodiment described above, the pointing device 40 is arranged on the inner surface of a cover 16 in a depression 46, and the exit surface 58b of the light guide plate 58 faces a display section 54. Light emitted from the LEDs 56 is guided by the light guide plate 58 toward the display section 54 through the exit surface 58b and further emitted to the outside of a housing 14 via the display section 54. Thus, the upper side of an operation area 50 is illuminated by the display section 54, whereby the position of the operation area 50 is displayed.

In the second embodiment, other configurations of the personal computer are the same as those of the first embodiment. The same functions and effects as those of the first embodiment can also be obtained by the use of the pointing device 40 constructed in this manner. According to the second embodiment, moreover, the LEDs can be reduced in number, and the light guide plate 58 can be miniaturized.

Figure 8:
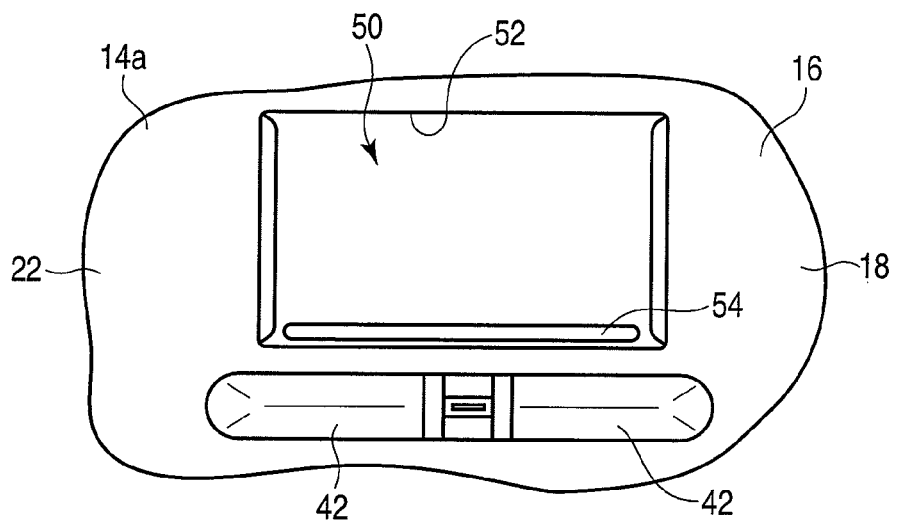
FIG. 8 is an exemplary plan view schematically showing an operation area and a display section of a personal computer according to a third embodiment of the invention.

FIG. 8 shows an operation area 50 of a personal computer according to a third embodiment of the invention. According to the present embodiment, a display section 54 that displays the operation area 50 extends along one side of the operation area 50 or of a recess 52 on the front end side of a housing 14 and is situated between the operation area 50 and click switches 42. That part of a surface layer 18 which corresponds to the display section 54 is formed to be transparent and permeable to light.

Figure 9:
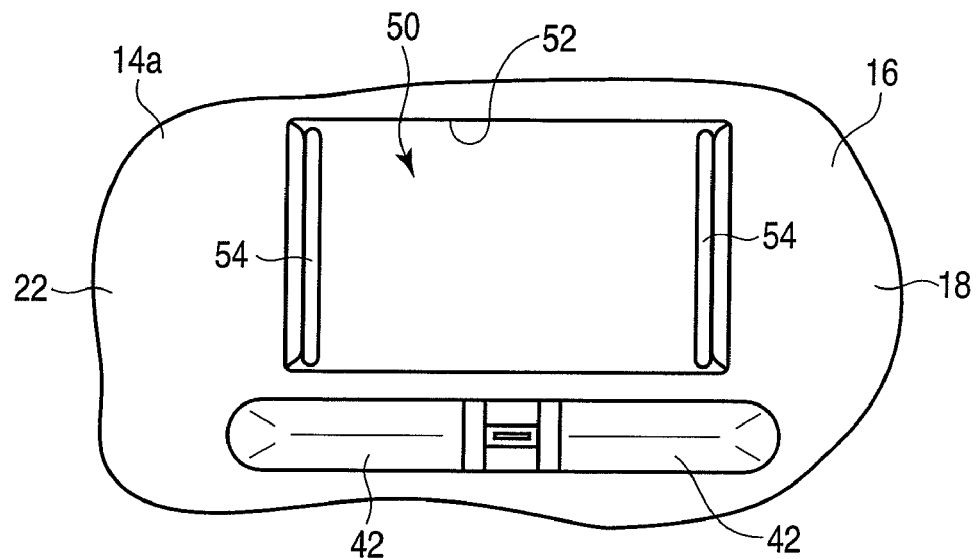
FIG. 9 is an exemplary plan view schematically showing an operation area and a display section of a personal computer according to a fourth embodiment of the invention.

FIG. 9 shows an operation area 50 of a personal computer according to a fourth embodiment of the invention. According to the present embodiment, two display sections 54 are provided for displaying the operation area 50. These display sections 54 extend individually along two sides of the operation area 50 or of a recess 52 that extend along the depth of the housing 14. Those parts of a surface layer 18 which correspond individually to the display sections 54 are formed to be transparent and permeable to light.

Figure 10:
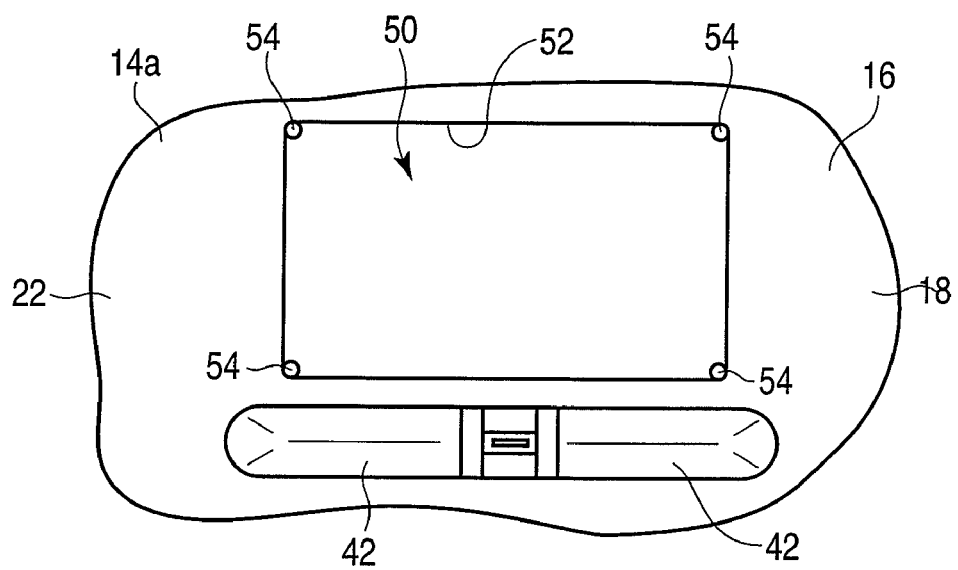
FIG. 10 is an exemplary plan view schematically showing an operation area and a display section of a personal computer according to a fifth embodiment of the invention.

FIG. 10 shows an operation area 50 of a personal computer according to a fifth embodiment of the invention. According to the present embodiment, four display sections 54 are provided for displaying the operation area 50. These display sections 54 are formed individually as dots in four corner portions of the operation area 50. Those parts of a surface layer 18 which correspond individually to the display sections 54 are formed to be transparent and permeable to light.

In the third, fourth, and fifth embodiments described herein, other configurations of the personal computer, including those portions which are not shown, are the same as those of the foregoing first embodiment. Therefore, like reference numbers are used to designate like portions of those embodiments, and a detailed description thereof is omitted. The same functions and effects as those of the first embodiment can also be obtained with the third, fourth, and fifth embodiments.

Since the display sections 54 according to the fifth embodiment are dot-shaped, light sources such as LEDs may be located directly opposite the display sections 54 without using a light guide plate.

While certain embodiments of the invention have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The input surface of the pointing device is not limited to a palm rest, but may be located overlapping any part of the inner surface of the housing, provided that the operation area 50 is situated corresponding to at least a part of the pointing device. The electronic apparatus according to the present invention is not limited to a portable computer, but may be widely applied to various other electronic apparatuses, such as an electronic notebook, PDA, etc. The light sources of the pointing device are not limited to LEDs but may be replaced with lamps or any other suitable light sources.

What is claimed is:

1. An electronic apparatus comprising:
   a housing comprising an outer surface, an inner surface, and a light-transmitting section, which is formed of a material permeable to light and permeable to light, in at least a part of the housing;
   a surface layer having a light-shielding effect and configured to cover an outer surface of the housing;
   a pointing device comprising a board, a sensor sheet located on one surface of the board and comprising a flat input surface, a light source on another surface of the board, and a light guide plate on the board, configured to guide light from the light source, the pointing device being located in the housing with the input surface on the inner surface of the housing;
   an operation area provided in a position on the outer surface of the housing corresponding to at least a part of the input surface of the pointing device; and
   a display section positioned along at least a part of an outline of the operation area in the light-transmitting section of the housing and configured to display a position of the operation area;
   wherein the light guide plate comprises an exit surface opposite to the display section on a side of the inner surface of the housing and is configured to illuminate the display section from the inner surface side of the hosing;
   a region of the surface layer which overlaps with the display section is formed to be transparent.

2. The electronic apparatus of claim 1, wherein the pointing device and the operation area are rectangular and the display section is in the form of a belt extending along at least one side of the operation area.

3. The electronic apparatus of claim 2, further comprising a keyboard provided on the housing, wherein the operation area comprises a side extending beside the keyboard and the display section is arranged along the one side of the operation area between the operation area and the keyboard.

4. The electronic apparatus of claim 1, wherein the pointing device and the operation area are rectangular and the display section is formed in at least one corner portion of the operation area.

5. The electronic apparatus of claim 1, wherein the operation area is provided with a recess formed in the outer surface of the housing.

6. The electronic apparatus of claim 1, wherein a region of the surface layer which overlaps the operation area is formed to be different in surface roughness from a surrounding region.

7. The electronic apparatus of claim 1, further comprising a plurality of control button indicators individually provided on the outer surface of the housing, a touch pad arranged on the inner surface of the housing configured to face the control button indicators and to detect an input operation through the control button indicators, and a plurality of light sources which are arranged on the inner surface side of the housing so as to face the control button indicators and illuminate the control button indicators, individually.

* * * * *